(12) United States Patent
Izumi et al.

(10) Patent No.: US 10,297,883 B2
(45) Date of Patent: May 21, 2019

(54) COOLING SYSTEM FOR ON-VEHICLE SECONDARY BATTERY

(71) Applicant: TOYOTA JIDOSHA KABUSHIKI KAISHA, Toyota-shi, Aichi-ken (JP)

(72) Inventors: Junta Izumi, Nagoya (JP); Kiyohito Machida, Nissin (JP); Masakazu Habu, Toyota (JP); Kiyoe Ochiai, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 366 days.

(21) Appl. No.: 15/094,216

(22) Filed: Apr. 8, 2016

(65) Prior Publication Data
US 2016/0301119 A1 Oct. 13, 2016

(51) Int. Cl.
| H01M 10/48 | (2006.01) |
| H01M 10/6563 | (2014.01) |
| H01M 10/613 | (2014.01) |
| H01M 10/625 | (2014.01) |
| H01M 10/633 | (2014.01) |

(52) U.S. Cl.
CPC ....... *H01M 10/6563* (2015.04); *H01M 10/48* (2013.01); *H01M 10/613* (2015.04); *H01M 10/625* (2015.04); *H01M 10/633* (2015.04)

(58) Field of Classification Search
CPC .......... H01M 10/6563; H01M 10/613; H01M 10/625; H01M 10/633; H01M 10/48
USPC ........................................................ 429/90
See application file for complete search history.

(56) References Cited

U.S. PATENT DOCUMENTS

| 7,348,741 B2* | 3/2008 | Minekawa | ............ B60L 3/0046 |
| | | | 318/268 |
| 2007/0178346 A1* | 8/2007 | Kiya | ................... H01M 10/486 |
| | | | 429/432 |
| 2009/0024252 A1 | 1/2009 | Aridome et al. | |
| 2013/0268151 A1 | 10/2013 | Bito | |
| 2014/0370333 A1 | 12/2014 | Kwon et al. | |
| 2016/0301116 A1* | 10/2016 | Ochiai | .............. H01M 10/0525 |

FOREIGN PATENT DOCUMENTS

| JP | 2001-313092 A | 11/2001 |
| JP | 2005-353307 A | 12/2005 |
| JP | 2007-200780 A | 8/2007 |
| JP | 2007-234368 A | 9/2007 |
| JP | 2009-252477 A | 10/2009 |
| JP | 2010-158964 A | 7/2010 |
| JP | 2013-216173 A | 10/2013 |

* cited by examiner

*Primary Examiner* — Anthony R Jimenez
(74) *Attorney, Agent, or Firm* — Sughrue Mion, PLLC

(57) ABSTRACT

If the battery temperature TB of the main battery is equal to or higher than the first temperature T0 and a noise level within a vehicle interior is equal to or higher than a predetermined value Lo during inhibition of the first constant control under a predetermined condition, the cooling system performs second constant control for driving the cooling fan with a second command value D3 and also performs the problem detection processing based on an actual rotation rate of the cooling fan during the second constant control.

6 Claims, 13 Drawing Sheets

COOLING SYSTEM FOR ON-VEHICLE SECONDARY BATTERY

PRIORITY INFORMATION

This application claims priority to Japanese Patent Application No. 2015-080686, filed on Apr. 10, 2015, which is incorporated herein by reference in its entirety.

TECHNICAL FIELD

The present invention relates to a cooling system for cooling secondary battery used for driving a hybrid vehicle.

BACKGROUND

Hybrid vehicles include a secondary battery mounted thereon for storing electric energy for driving a vehicle. The temperature of a secondary battery rises with charge and discharge due to an internal resistance of the secondary battery itself. Conventional techniques have therefore suggested providing a cooling fan around the secondary battery to forcibly cool the secondary battery.

JP 2010-158964 A, for example, discloses a cooling apparatus for vehicle electronic equipment, which includes a cooling fan near a secondary battery. This cooling apparatus changes the command duty of the cooling fan in accordance with the temperatures of a high-voltage secondary battery which are to be cooled and anon-vehicle charging device. In other words, the cooling apparatus controls driving of the cooling fan based on variable control. This cooling apparatus further detects failure of the cooling fan, and if failure occurs, outputs failure information to a failure diagnosis function unit, that is, causes the failure diagnosis function unit of a control unit to record the failure information. This cooling apparatus further changes control for the electronic equipment in accordance with the content of failure.

SUMMARY

Detected parameters including the actual rotation rate of the cooling fan, for example, may be used for determining occurrence of a problem in the cooling fan. In one example method, a command rotation rate supplied to the cooling fan and the actual rotation rate of the cooling fan are compared to determine the problem with the cooling fan.

It is desirable to determine the presence or absence of problems as described above in a stationary state of the cooling fan where driving of the cooling fan is stabilized, because significant change in the driving state (the rotation rate of a fan, and other parameters) of the cooling fan may inhibit continuous accuracy in determining the presence or absence of failure due to control delay which makes the actual rotation rate deviate from the command rotation rate, for example.

One possible solution for stabilizing driving of the cooling fan would be to drive the cooling fan at a constant duty (constant rotation rate) without changing the command duty (command rotation rate) of the cooling fan. Driving the cooling fan at a constant duty, however, would make it difficult to cool the secondary battery in accordance with the temperature of the secondary battery. This may result in an insufficient rotation rate of the cooling fan, leading to insufficient cooling and thus overheating of the secondary battery.

While constant control of the cooling fan in a high output state (at maximum duty, for example) may address cooling of the secondary battery at high temperatures, this may, in turn, cause overcooling of the secondary battery. Another problem of increased noise of the cooling fan further also arises, which makes passengers feel uncomfortable.

It is therefore an advantage of the present invention to ensure sufficient opportunities for detecting problems with the cooling fan, while preventing passengers from feeling uncomfortable and suppressing overheating or overcooling of the secondary battery.

In accordance with one aspect, the present invention relates to a cooling system for cooling a secondary battery mounted on a hybrid vehicle for driving the vehicle. The system includes a cooling fan configured to blow cooled air to the secondary battery and a temperature sensor configured to detect a battery temperature which is a temperature of the secondary battery. If the battery temperature is equal to or higher than a first temperature after start-up of the hybrid vehicle, the cooling system, for a predetermined time period, performs first constant control for driving the cooling fan with a first command value and also performs problem detection processing for detecting presence or absence of a problem with the cooling fan based on an actual rotation rate of the cooling fan during the constant control. Further, if the battery temperature is equal to or higher than the first temperature and, during inhibition of the first constant control under a predetermined condition, a noise level within a vehicle interior is equal to or higher than a predetermined value, the cooling system performs second constant control for driving the cooling fan with a second command value and also performs the problem detection processing based on an actual rotation rate of the cooling fan during the second constant control.

Preferably, in the above system, the condition under which the first constant control is inhibited includes at least one of a condition that the battery temperature at the time of start-up of the vehicle is equal to or higher than a second temperature, and a condition that the battery temperature is equal to or higher than the first temperature and the hybrid vehicle is driving in an EV mode in which the vehicle is driven solely by a rotary electric machine.

Preferably, in the above system, the second command value is a command value for a higher output than the first command value.

Preferably, in the above system, when at least one of a condition that an on-vehicle audio system is placed in an ON state, a condition that an air conditioning blower within the vehicle interior is placed in an ON state, a condition that a vehicle interior window is open, and a condition that an engine is being driven is established, it is determined that the noise level within the vehicle interior is equal to or higher than the predetermined value.

ADVANTAGE OF THE INVENTION

The present invention can ensure sufficient opportunities for detecting problems with the cooling fan while preventing passengers from feeling uncomfortable and suppressing overheating or overcooling of the secondary battery.

BRIEF DESCRIPTION OF THE DRAWINGS

Preferred embodiments of the present invention will be described in detail with reference to the following figures, wherein.

DESCRIPTION OF EMBODIMENTS

Preferred embodiments of the present invention will be described in detail with reference to the accompanying drawings.

System Structure of Electric Drive Vehicle

Figure 1:
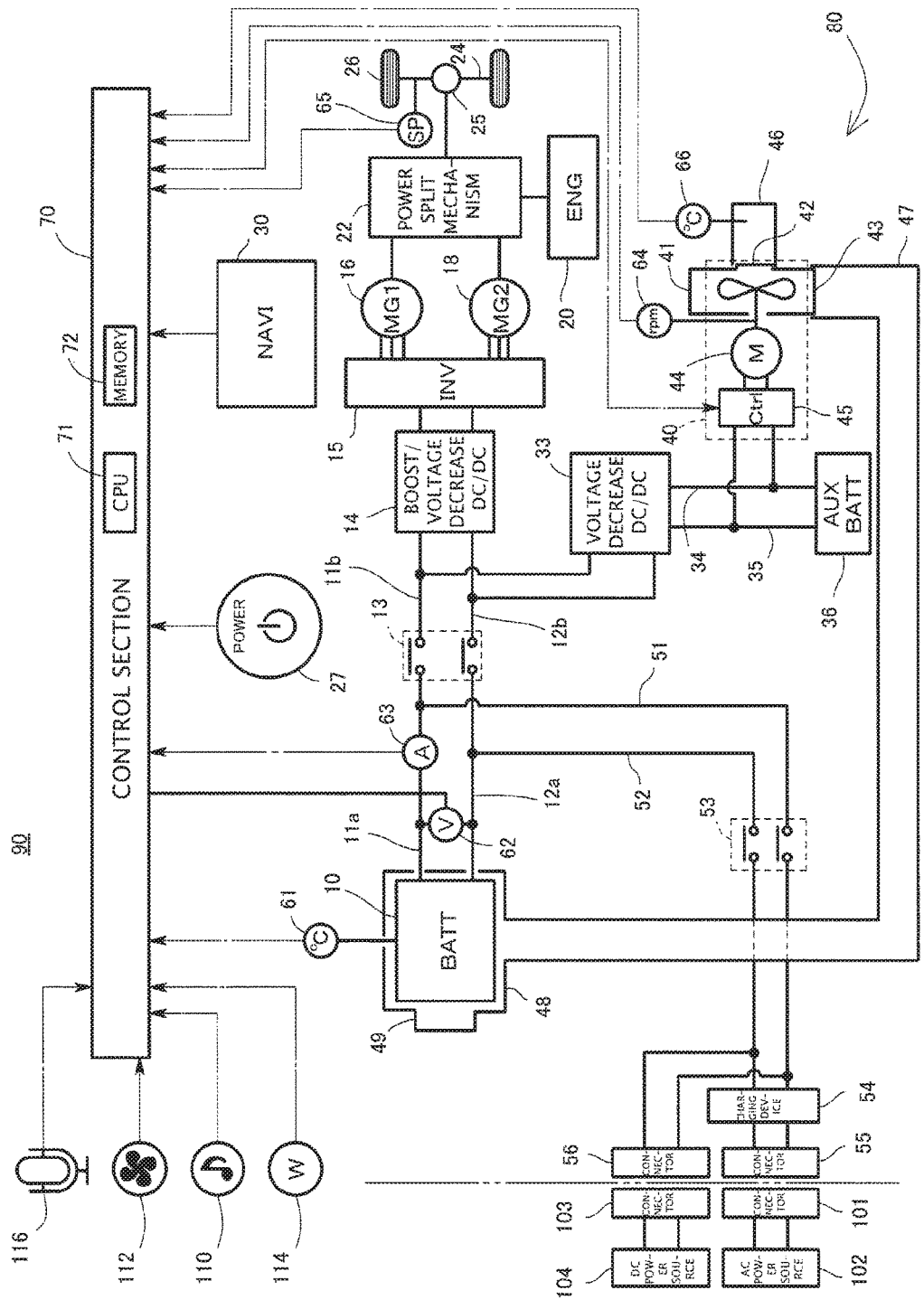
FIG. 1 is a system diagram illustrating a structure of a cooling system for an on-vehicle secondary battery according to an embodiment of the present invention.

Preferred embodiments of the present invention will be described with reference to the drawings. A system structure of a hybrid vehicle 90 on which a cooling system 80 for an on-vehicle secondary battery is mounted will first be described. In FIG. 1, dashed and single-dotted lines denote signal lines.

The hybrid vehicle 90 utilizes multiple power sources (motor generators 16 and 18, and an engine 20) to drive wheels 20. A main battery 10 for driving the vehicle is connected to each of positive-side and negative-side input terminals of a system main relay 13 through a positive-side bus bar 11a and a negative-side bus bar 12a. The main battery 10 is a chargeable/dischargeable secondary battery such as a nickel metal hydride battery or a lithium ion battery.

A positive-side output terminal and a negative-side output terminal of the system main relay 13 are connected to a boost converter 14 through a positive side bus bar 11b and a negative-side bus bar 12b, respectively. A positive-side output terminal and a negative-side output terminal of the boost converter 14 are connected to a positive-side input terminal and a negative-side input terminal of an inverter 15, respectively. Three output bus bars of U phase, V phase, and W phase are connected to the inverter, and each output bus bar is connected to an input terminal of each phase of the first and second motor generators 16 and 18.

The output shafts of the motor generator 16 and 18 are connected to a power split mechanism 22 employing a planetary gear train. An output shaft of an engine 20 is also connected to the power split mechanism 22. An output shaft of the power split mechanism 22 drives the wheels 26 via a gear mechanism 25 and a vehicle axle 24. The vehicle axle 24 includes a vehicle speed sensor 65 attached thereto for detecting the vehicle speed from the rotation rate.

The positive-side bus bar 11a and the negative-side bus bar 12a connected to the main battery 10 branch into a positive-side bus bar 51 and a negative-side bus bar 52, respectively, as branch paths of electric power. The bus bars 51 and 52 are connected, via a charging relay 53, to a charging device 54 which converts electric power from an external AC power source into charging power for charging the main battery 10.

A connector 55 (inlet) is connected to the charging device 54. The connector 55 can be connected to a connector 101 (a charging plug) of an AC power source 102 (e.g. commercial power source). Connection of the connector 101 to the connector 55 allows the AC power source 102 to charge main battery 10. A connector 56 to which a connector 103 of an external DC power source 104 can be connected is connected to the positive-side and negative-side bus bars 51 and 52, so that the battery 10 can also be charged by the external DC power source 104.

A DC/DC converter 33 (voltage decrease converter) is also connected to the positive-side and negative-side bus bars 11b and 12b, to which the positive-side output terminal and the negative-side output terminal of the system main relay 13 are respectively connected. The main battery 10 is connected to the system main relay 13.

Outputs of the DC/DC converter 33 are connected to an auxiliary battery 36. The DC/DC converter 33 decreases the voltage of the main battery 10 to an auxiliary voltage, such as 12V or 24V, for charging the auxiliary battery 36.

A cooling fan 40 is connected to the auxiliary battery 36. The cooling fan 40 is formed of a motor-driven cooling fan for blowing cooled air to the battery 10. The cooling fan 40 is composed of a fan body 41 which houses an impeller, a motor 44 for driving the impeller, and a control unit 45 for controlling the speed of the motor 44.

A suction duct 46 for drawing cooled air is connected to an inlet port 42 of the fan body 41, and a connection duct 47 for supplying cooled air to a casing 48 that houses the main battery 10 is connected to an outlet port 43 of the fan body 41. An exhaust duct 49 for discharging the air after cooling the main battery 10 is mounted on the easing 48.

An ignition switch 27 is further provided within an interior of the hybrid vehicle 90. The ignition switch 27 receives commands to start-up and shut down the hybrid vehicle 90 from a user. A navigation system 30 which detects the current position of the hybrid vehicle 90 or performs route guide to a destination is also provided within the vehicle interior. A control section 70, based on the route information provided by the navigation system 30, estimates an inclination Inc of the current position.

The hybrid vehicle 90 also includes, within the vehicle interior, an audio switch 110 for an on-vehicle audio system, an air conditioner switch 112 for an air conditioning blower for vehicle interior, and a power window switch 114. The control section 70, in accordance with ON/OFF operations of these switches, controls actuation/stop of the audio system and the air conditioning system and also controls opening and closing a window in the vehicle interior.

A sound collecting microphone 116 such as a voice recognition microphone for the navigation system 30 is further provided within the interior of the vehicle 90. The control section 70 controls the navigation system 30 based on the speech received by the sound collecting microphone 116. The control section 70 further receives vehicle interior sound [dB] through the sound collecting microphone 116.

Concerning measuring instruments for the main battery 10, a temperature sensor 61 for detecting the temperature of the main battery 10 (hereinafter referred to as "battery temperature TB") is mounted on the main battery 10. A single temperature sensor 61 may be provided or a plurality of temperature sensors may be provided at a plurality of locations. When a plurality of temperature sensors 61 are provided, a statistic of values detected by the plurality of temperature sensors 61, such as a mean value, a minimum value, a maximum value, or other value, is used as the battery temperature TB.

A voltage sensor 62 for detecting the voltage VB of the main battery 10 is connected between the positive-side bus bar 11a and the negative-side bus bar 12a connected to the main battery 10. A current sensor 63 for detecting the charging and discharging current IB of the main battery 10 is further mounted on the positive-side bus bar 11a between the main battery 10 and the system main relay 13.

A rotation sensor 64 for detecting the rotation rate of the motor 44 is mounted on the cooling fan 40, and a temperature sensor 66 for detecting the temperature of the suction air is mounted on the suction duct 46.

The control section 70 calculates SOC, based on the voltages VB and the currents 1B, and the battery temperatures TB, and other values that are detected. The control section 70 further controls driving of the motor generators 16 and 18 and the engine 20 such that the SOC is not below a predetermined lower threshold value or does not exceed a predetermined upper threshold value.

As illustrated in FIG. 1, a control unit 45 of the cooling fan 40 is connected to the control section 70. The cooling fan 40 is driven by the commands of the control section 70 via the control unit 45. The ignition switch 27, the temperature sensors 61 and 66, the voltage sensor 62, the current sensor 63, the rotation rate sensor 64, and the vehicle speed sensor 65 are also connected to the control section 70, and a Ready-ON signal and a Ready-OFF signal of the ignition switch 27, and detection signal of the sensors 61 to 66 are input to the control section 70.

The audio switch 110, the air conditioner switch 112, and the power window switch 114 are also connected to the control section 70, so that ON/OFF signals of these switches are input to the control section 70. The sound collecting microphone 116 is further connected to the control section 70, and voice signals received by the sound collecting microphone 116 are input to the control section 70. In addition, signals concerning the accelerator position Acc, the amount of depression of the brake, and other data are input to the control section 70.

The control section 70 is also referred to as an ECU (Electronic Control Unit) which is a computer containing a CPU 71 which performs operation processing and signal processing, and a memory 72 which stores control data, maps, programs, and other data for control. The control section 70 also receives an ON/OFF signal indicating whether or not the engine 20 is operating from another controller and a signal indicating whether or not the connectors 55 and 56 are respectively connected to the external connectors 101 and 103.

Basic Operation of Hybrid Vehicle

The basic operation of the hybrid vehicle 90 configured as described above will be briefly described. When the hybrid vehicle is placed in a Ready-ON state, the system main relay 13 turns on, and direct-current electric power of the main battery 10 is supplied via the boost converter 14 from the inverter 15 to each of the motor generators 16 and 18.

The Ready-ON state refers to a vehicle actuation state. The vehicle actuation state, in turn, generally refers to a state in which the state of the vehicle is changed from a driving disabled state to a driving enabled state. Concerning the hybrid vehicle 90, the above definition is further extended, such that a state in which the power source system of the hybrid vehicle 90 is turned on, that is, a state in which the control section 70 (ECU) is started, is included in the Ready-On state or the vehicle actuation state. Specifically, a case where the ignition switch 27 is turned ON by a user, a case where control section 70 is started by an external charging operation, a case where the control section 70 is automatically started at a preset time in accordance with a preset start-up function, and other similar cases may be included in the Ready-ON state vehicle actuation state).

For starting driving of the vehicle, the first motor generator 16 is started to actuate the engine 20 when the hybrid vehicle 90 is stopped. In other words, the engine 20 is cranked by the first motor generator 16.

The output of the engine 20 is distributed by the power split mechanism 22. A part of the output is used to drive the first motor generator 16 while the remaining output is output from the power split mechanism 22, along with the output from the second motor generator 18 which functions as a motor, to rotate the wheels 26.

At this time, the first motor generator 16 functions as a power generator and generates alternating current power which is consumed as electric power for driving the second motor generator 18. At the same time, the main battery 10 is discharged to supply required electric power to the second motor generator 18.

If the electric generated by the first motor generator 16 is greater than the electric power which is necessary for the second motor generator 18, the excessive alternating current power which is generated is converted into direct current power by the inverter 15 and used to charge the main battery 10.

For decelerating the hybrid vehicle 90, the second motor generator 18 functions as a power generator to reduce the rotation of the wheels 26 (dynamic braking). The alternating current power generated at this time is converted by the inverter 15 into direct-current power and is used to charge the main battery 10.

The driving modes of the hybrid vehicle 90 described above include a torque conversion driving mode, a charge and discharge driving mode, an EV driving mode, an engine-direct torque driving mode, and other modes.

In the torque conversion driving mode, the operation of the engine 20 is controlled such that a power corresponding to the required power is output from the engine 20. Further, driving of the motor generators 16 and 18 is controlled such that alt the power output from the engine 20 is converted by the power split mechanism 22 and the motor generators 16 and 18 into a torque and output to the drive shaft.

In the charge and discharge driving mode, the operation of the engine 20 is controlled such that a power corresponding to a sum of the required power and a power which is necessary for charging and discharging the main battery 10 is output from the engine 20. Further, the motor generators 16 and 18 are controlled such that torque conversion performed by the power split mechanism 22 and the motor generators 16 and 18 allows a part of the power output from the engine 20 to be distributed for charging and discharging the main battery 10 while allowing a part of the remaining power to be distributed to the drive shaft.

In both the torque conversion driving mode and the charge and discharge driving mode, the engine 20 and the motor generators 16 and 18 are controlled such that the required power is output to the drive shaft along with the load operation of the engine 20. Hereinafter, both of the driving modes wilt be together referred to as a "hybrid driving mode".

In the engine-direct torque driving mode, the operation of the motor generator 18 is stopped, and, with a reaction force of the engine torque being assigned to the motor generator 16, the vehicle drives only with the torque directly transmitted to the drive shaft from the engine 20 via the power split mechanism 22.

The EV driving mode is also referred to as an electric driving mode or a motor driving mode. During the EN driving mode, the operation of the engine 20 is stopped and the operation of the motor generator 18 is controlled such that a power corresponding to the power required from the vehicle is output to the drive shaft. In other words, the vehicle is driven only with the motor generator 18. The power to the motor generator 18 is supplied from the main battery 10.

Driving Control of Cooling Fan

Figure 2:
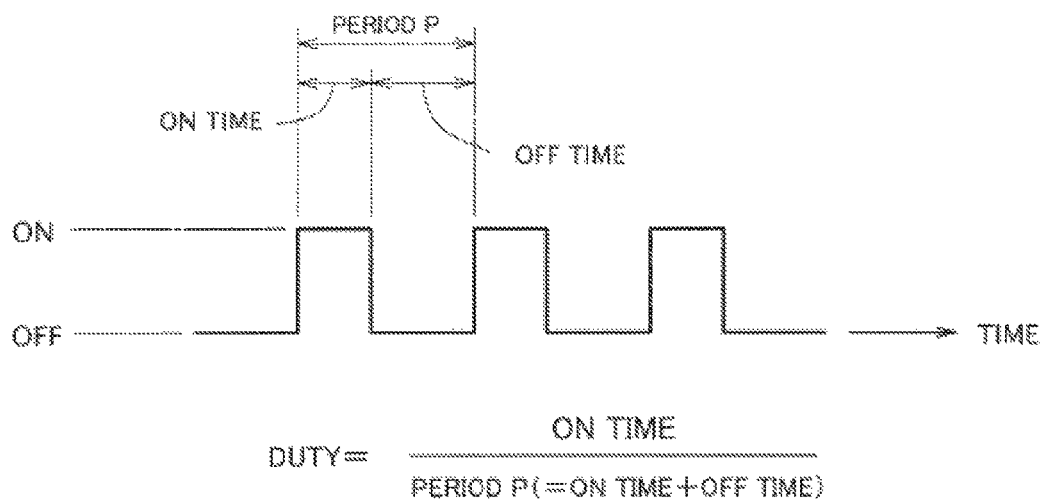
FIG. 2 is an explanatory view for explaining duty control.

The rotation rate of the motor 44 of the cooling fan 40 is adjusted in accordance with duty control. If the motor 44 is a direct current motor, according to the duty control, application of the direct current voltage to the motor 44 is periodically turned on and off to change the duty, which is a ratio of ON time with respect to an ON/OFF period P (=ON time+OFF time), as illustrated in FIG. 2. The duty is represented by the following Formula 1.

$$\text{DUTY} = \frac{\text{ON TIME}}{\text{PERIOD } P} = \frac{\text{ON TIME}}{\text{ON TIME + OFF TIME}} \quad \text{(FORMULA 1)}$$

If the duty is 0, no voltage is applied to the motor 44 and the cooling fan 40 would not be driven. If the duty is 100% (the MAX duty), the voltage of low-voltage bus bars 34 and 35 is directly applied to the motor 44. If the duty is between 0 and 100%, the voltage obtained by multiplying the voltage of the low-voltage bus bars 34 and 35 with the duty is an average voltage applied to the motor 44.

Figure 3:
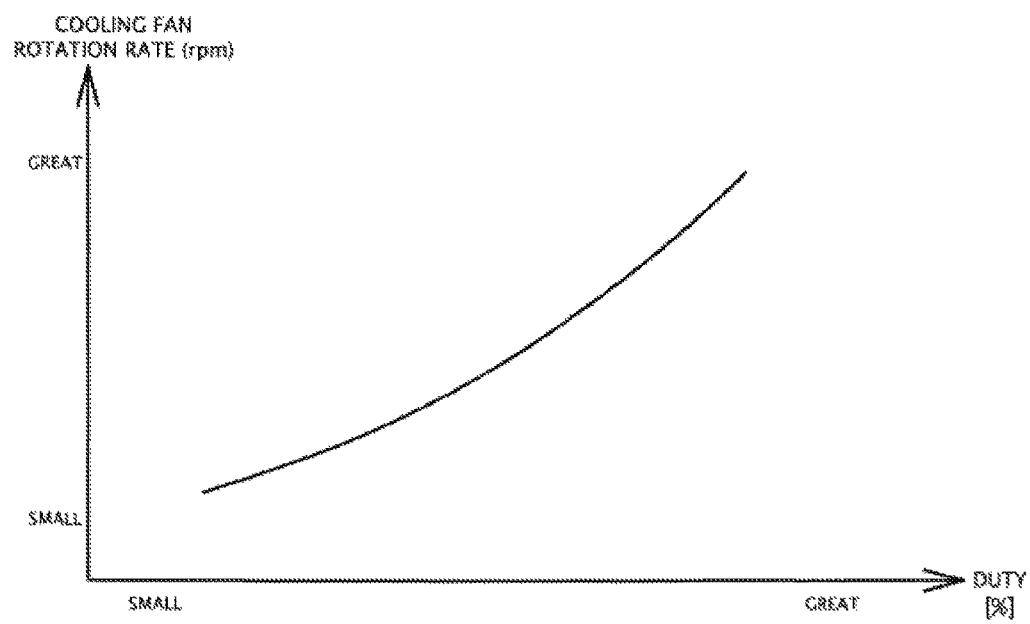
FIG. 3 is a graph showing the rotation rate of a cooling fan with respect to a command duty.

As a certain correlation is established between the rotation rate of the motor 44 and the duty, as illustrated in FIG. 3, adjustment of the duty according to the duty control enables adjustment of the rotation rate of the motor 44, that is, the rotation rate of the cooling fan 40, to a desirable rotation rate.

As a certain correlation is also established between the rotation rate and the airflow rate of the cooling fan 40, adjustment of the duty also enables adjustment of the airflow rate of the cooling fan 40 to a desired rate.

The control unit 45 of the cooling fan 40 contains therein a switching element which turns the direct current on and off, and turns the direct current to be supplied to the motor 44 on and off in accordance with a command duty D input from the control section 70.

According to the present embodiment, the cooling fan 40 is driven based on variable duty control or constant duty control. In the variable duty control, the control section 70 determines a command duty D of the cooling fan 40 in accordance with various detected parameters including at least the battery temperature TB, and outputs the command duty D to the control unit 45. The detected parameters that are referenced for determining the command duty D may include, in addition to the battery temperature TB, the temperature of intake air of the cooling fan 40 which is detected by the temperature sensor 66, the battery temperature TB detected by the temperature sensor 61, the vehicle speed Ve1 detected by the vehicle speed sensor 65, the battery current IV, the driving states of the engine 20 and the air conditioner, and other parameters.

Figure 4:
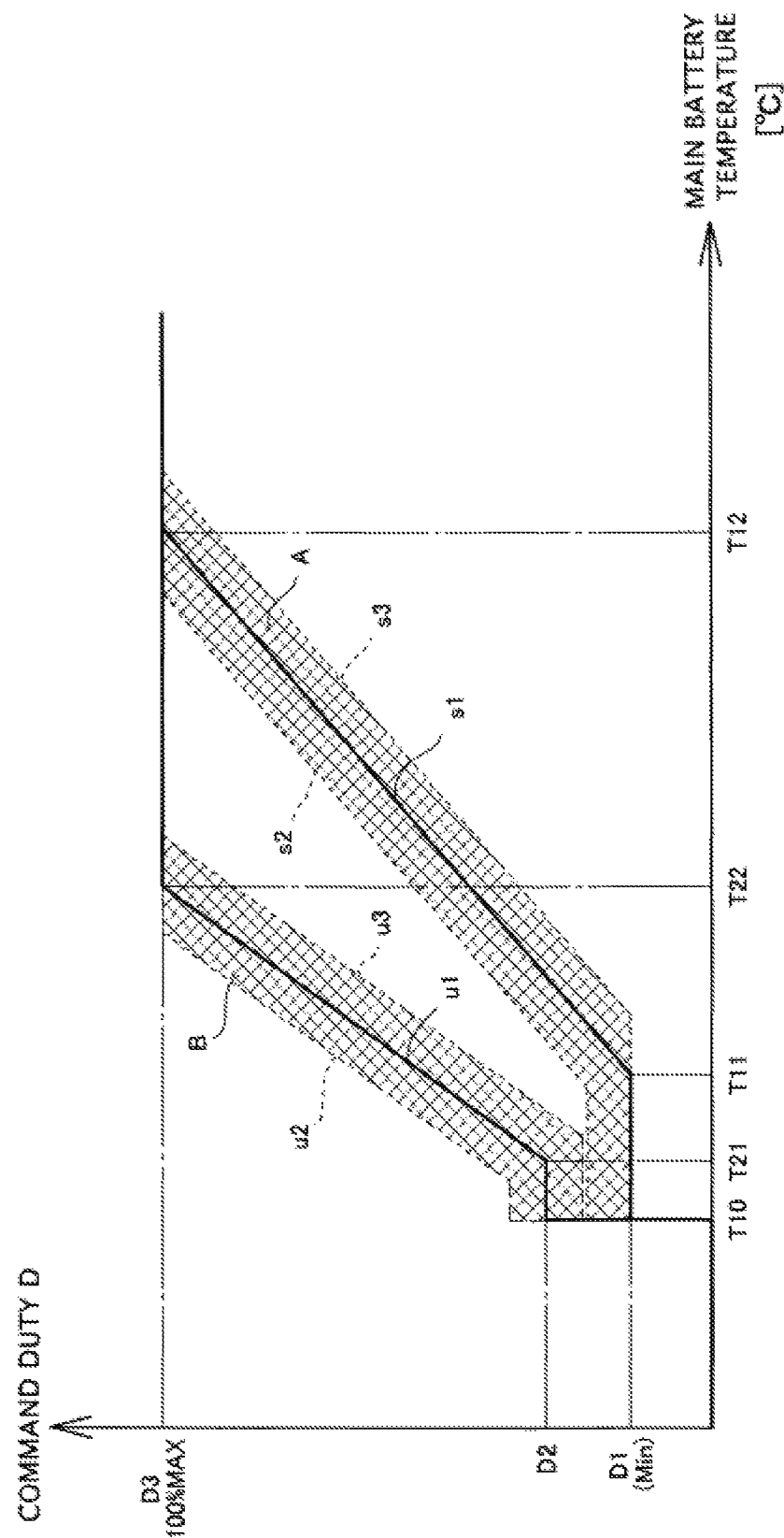
FIG. 4 is a duty map for determining the command duty.

In order to determine the command duty D, according to the present embodiment, a duty map stored in the memory 72 of the control section 70 is used. The duty map represents a correlation between values of the various detected parameters and the command duty. FIG. 4 is one example map among duty maps of various forms.

Solid line s1 shown in FIG. 4 is a reference line which defines a command duty D having a comparatively low sensitivity with respect to the battery temperature TB. This reference line s1 of comparatively low command duty D is employed, for example, when the outside-air temperature is in the vicinity of room temperature and the temperature difference ΔT between the battery temperature TB and the temperature of the intake air of the cooling fan 40 is great (i.e. when comparatively cool air is supplied), or when higher priority is placed on a reduction of the power consumption than to the cooling ability.

In this case, as shown by solid line s1 in FIG. 4, the command duty D is set to zero until the battery temperature TB reaches temperature T10 and to the minimum value D1 (MIN) when the temperature of the main battery 10 is between temperature T10 and temperature T11. The minimum value D1 is a minimum duty value for controlling the rotation rate of the motor 44 in a stable manner according to the duty control, and is about 10%, for example.

When the battery temperature TB exceeds temperature T11, the command duty D increases with an increase in the battery temperature TB. When the battery temperature TB reaches temperature T12, the command duty D becomes the maximum value D3 (MAX, 100% duty). The temperatures T10, T11, and T12 can be various values depending on the properties of the battery 10, battery type (nickel metal hydride battery or lithium ion battery), and the like. For example, T10 is about 36° C., T11 is about 38° C., and T12 is about 47° C.

The command duty D is also determined in consideration of detected parameters such as the vehicle speed Ve1 of the hybrid vehicle 90, in addition to the battery temperature TB. If the vehicle speed Ve1 of the hybrid vehicle 90 is high, the necessary power is large and input and output power of the main battery 10 is therefore large, and therefore the command duty D is increased from solid line s1 to dashed line s2 in FIG. 4. If the vehicle speed Ve1 of the hybrid vehicle 90 is low, on the other hand, the necessary power is small and the input and output power of the main battery 10 is not very large, and therefore the command duty D is decreased from solid line s1 to dashed line s3 in FIG. 4.

As described above, the command duty D varies within a region A which is cross-hatched between dashed lines s2 and s3 in FIG. 4 in accordance with the detected parameters such as the vehicle speed Ve1 of the hybrid vehicle 90 even when the battery temperature TB is fixed. In the following description, the duty map specified by these solid line s1, and dashed lines s2 and s3 will be referred to as a "low duty map". Solid line u1 shown in FIG. 4 is a reference line which defines a command duty D having a comparatively high sensitivity with respect to the battery temperature TB. This reference line u1 of comparatively high command duty D is employed, for example, when the outside-air temperature is in the vicinity of room temperatures and the temperature difference ΔT between the battery temperature TB and the temperature of the intake air of the cooling fan 40 is small, or when quick cooling of the main battery 10 is necessary.

In this case, as shown by the reference line u1, the command duty D is set to zero until the battery temperature TB reaches temperature T10, and to D2 when the temperature of the main battery 10 is between temperature T10 and temperature T21 (which is lower than T11). D2 is higher than the minimum value D1 but is smaller than the maximum value D3.

When the battery temperature TB exceeds temperature T21, the command duty D increases with an increase in the battery temperature TB. When the battery temperature TB reaches temperature T22, the command duty D reaches the maximum value D3 (MAX, 100% duty). At this time, the ratio of increase in the command duty with respect to the battery temperature TB is larger than that of the example case of solid line s1 which has been described above.

The command duty D varies within a region B which is cross-hatched between dashed lines u2 and u3 in FIG. 4 in accordance with the vehicle speed Ve1 of the hybrid vehicle 90. Similar to temperatures T10, T11, and 112, temperatures T21 and T22 can be various values. For example, T21 may be about 37° C. and T22 may be about 42° C. In the following description, the duty map specified by the solid line u1, and dashed lines u2 and u3 will be referred to as a "high duty map".

For performing variable duty control, the control section 70 determines the command duty D of the cooling fan 40 based on the duty map described above, and outputs the command duty D which is determined to the control unit 45. Whether the low duty map or the high duty map is referenced for determining the command duty D is determined in accordance with the battery temperature TB, the temperature difference $\Delta T$ between the battery temperature TB and the temperature of the intake air of the cooling fan 40, and the driving status of the vehicle (driving status of the engine and driving status of the air conditioner).

While FIG. 4 illustrates only two types of duty map (high duty map and low duty map), a greater number of duty maps may be stored. Also, while, in the present embodiment, the command duty D is determined based on the map, the command duty D may be calculated based on functions in which the detection parameters such as the battery temperature TB are used as variables.

As described above, according to the present embodiment, the constant duty control is also performed. During the constant duty control, the control section 70 outputs a fixed command duty D to the control unit 45. The command duty D used for the constant duty control may be unchanged only for a predetermined period and may be different values for each constant duty control.

As will be detailed below, the command duty D for performing the constant duty control is determined in accordance with the battery temperature TB and the input and output powers Wi and Wo, for example. In the present embodiment, the cooling fan 40 is driven under the constant duty control, and based on a difference $\Delta\omega$ between the actual rotation rate obtained during the driving and the target rotation rate, the presence or absence of a problem with the cooling fan 40 is determined.

Basic Operation of Cooling System for On-Vehicle Secondary Battery

Figure 5:
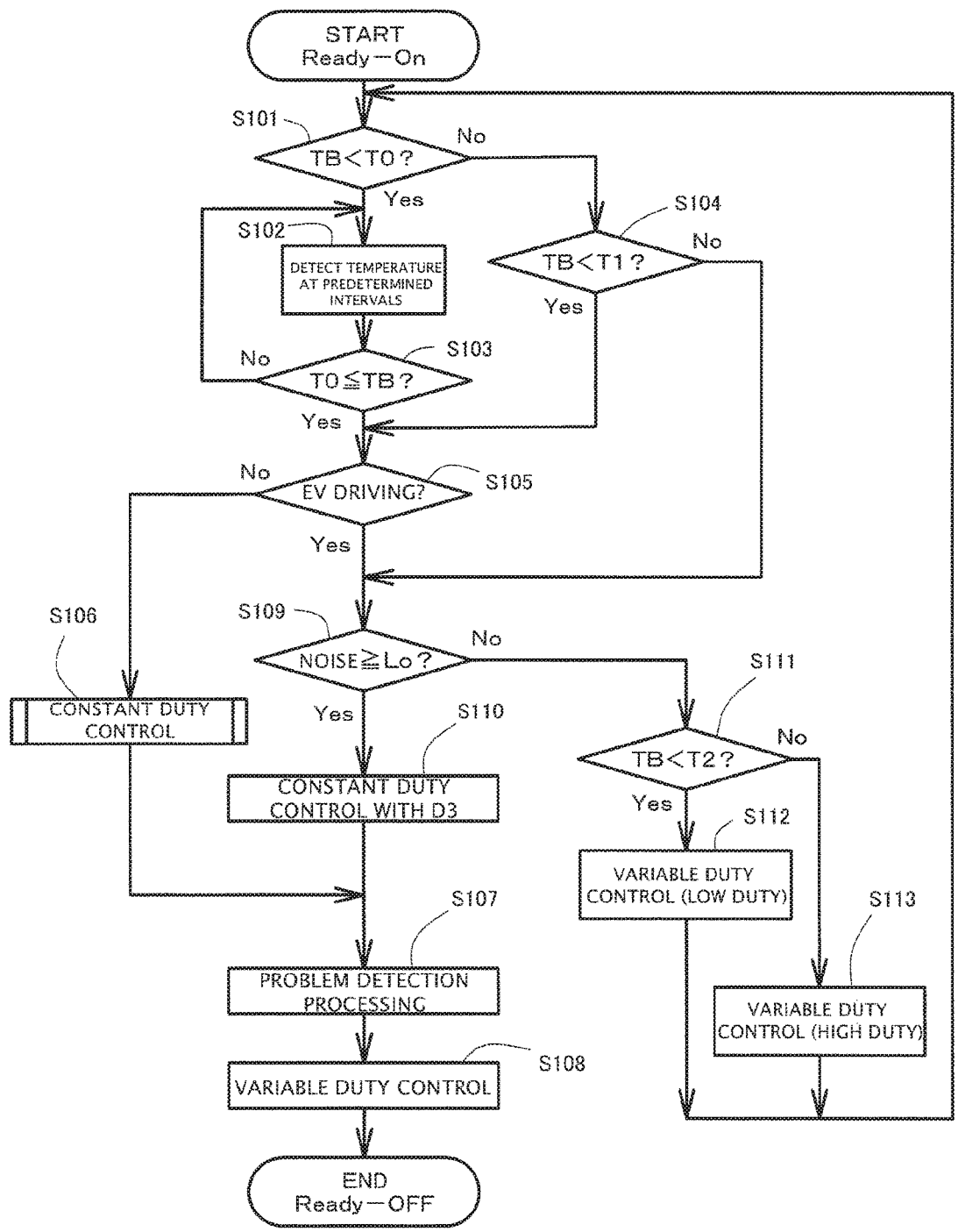
FIG. 5 is a flowchart showing the operation of a cooling system for an on-vehicle secondary battery according to the embodiment of the present invention.
Figure 6:
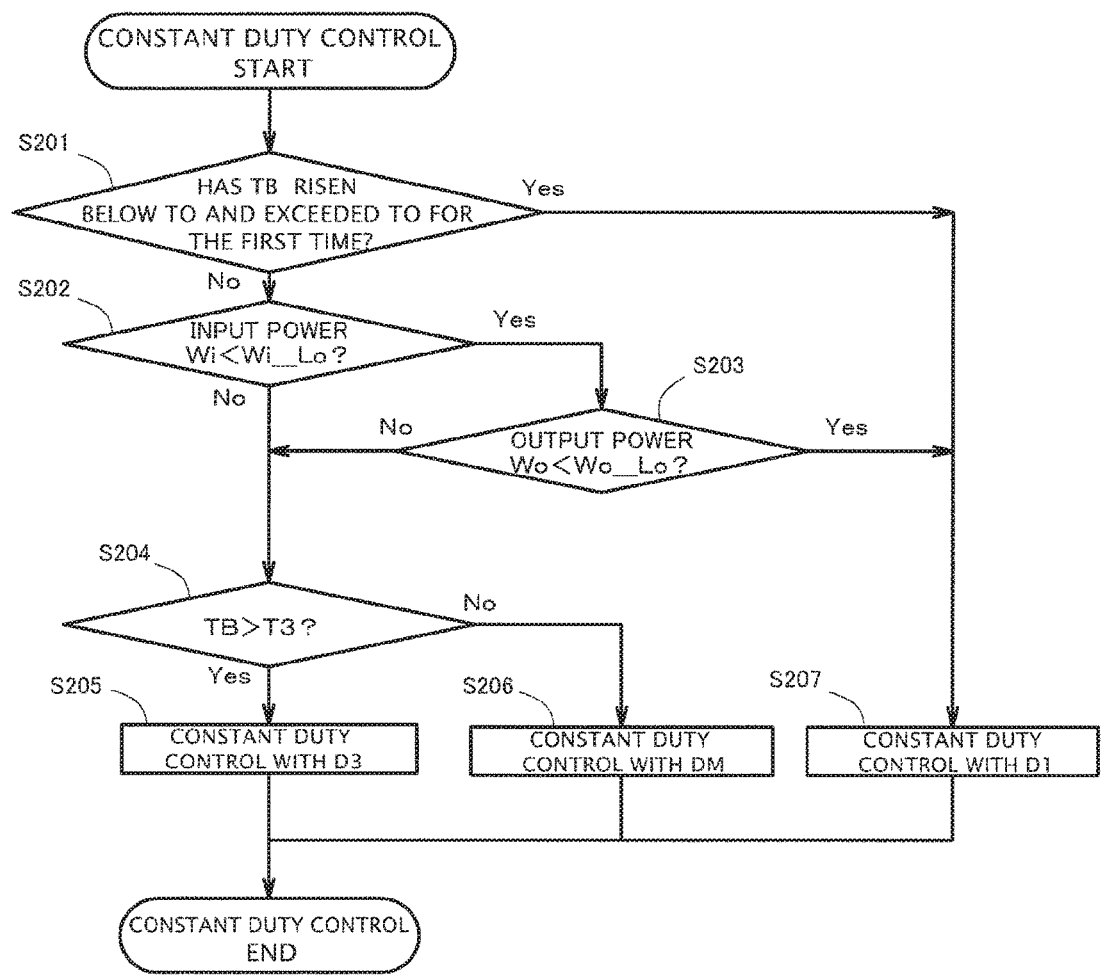
FIG. 6 is a flowchart showing constant duty control of the cooling fan shown in FIG. 5.

With reference to FIGS. 5 and 6, the operation of the cooling system 80 for the on-vehicle secondary battery will be described. Upon receiving an input Ready-ON signal (vehicle start signal), as shown in step S101 of FIG. 5, the control section 70 detects the battery temperature TB from the temperature sensor 61 and compares the battery temperature TB with a first temperature T0. The first temperature T0 is defined in accordance with the heat resistance and heating properties of the main battery 10, and is the lowest temperature at which forced cooling of the main battery 10 is necessary. The first temperature T0 is set to 36° C., for example.

If the battery temperature TB is below the first temperature T0, the control section 70 waits until the battery temperature TB reaches the first temperature T0. Specifically, the control section 70 detects the battery temperature TB using the temperature sensor 61 at predetermined times (S102), and compares the detected temperature with the first temperature T0 (S103).

If the cooling fan 40 is driven according to the constant duty control in order to perform problem detection processing with the battery temperature TB being low (that is, a state where cooling by the cooling fan 40 is not necessary), the main battery 10 would be overcooled, leading to deterioration of the charge and discharge properties of the main battery 10 and to unnecessary power consumption. Steps S101, S102 and S103 are therefore performed to constitute a control flow to prevent the cooling fan 40 from being operated when the battery temperature TB is low.

If the battery temperature TB is equal to or higher than the first temperature T0, the process proceeds to step S104 where the control section 70 compares the battery temperature TB with a second temperature T1, which is higher than the first temperature T0 and is about 40° C., for example.

This step determines whether or not the battery temperature TB is in a high temperature state, in other words, whether or not driving control of the cooling fan 40 based on the constant duty control would not cause the main battery 10 to be overheated. If Yes is determined, that is, T0≤TB<T1 is determined in this step, it is determined that the main battery 10 is not in a high temperature state. If No is determined, that is, T1≤TB is determined in this step, it is determined that the main battery 10 is in a high temperature state, and execution of the constant duty control is temporarily inhibited.

If Yes is determined in step S104, that is, if T0≤TB<T1 is determined, the process proceeds to step S105 where the control section 70 confirms whether or not the vehicle is driving in EV mode (BV driving). If the battery temperature TB reaches the first temperature T0 in step S103, the process also proceeds to step S10.5.

As described above, the EV driving is a driving state in which a power corresponding to the power required by the vehicle is output from the motor generator 18 with the operation of the engine 20 being stopped. The power is supplied to the motor generator 18 exclusively from the main battery 10.

During the EV driving, as the current IB of the main battery 10 varies with the change in the required driving force, the battery temperature TB is also apt to change. Therefore, in order to prevent the main battery 10 from being overheated, the driving state of the vehicle is determined in step S105 in order to temporarily inhibit execution of the constant duty control during the EV driving.

If No is determined, that is, if T0≤TB<T1 is satisfied and the vehicle is not in the state of EV mode (the vehicle is stopped or is in the state of hybrid driving mode) in step S105, the process proceeds to step S106 where the control section 70 executes the constant duty control.

As will be detailed below, for the constant duty control in step S106, the constant duty is obtained based on the battery temperature, the input and output power, and the like. Once the duty for constant control is obtained, the cooling fan 40 is driven with the duty for a predetermined period. Then, the process further proceeds to step S107 where, based on the actual rotation rate during the constant control, problem detection processing is executed for determining the presence or absence of a problem with the cooling fan 40.

As described above, the state where the vehicle is not driving in EV mode includes the state where the vehicle is stopped and the state where the vehicle is driving in hybrid driving mode. During the hybrid driving, as the variation of the required driving force can be addressed by a change in the output of the engine 20, it is unlikely that the current IB of the main battery 10 would change and thus the battery temperature TB would change. During stop, as no driving force is required, it is unlikely that the current IB of the main battery 10 would change and thus the battery temperature TB would change.

Accordingly, even if the fan is driven under the constant duty control while the vehicle is not in the state of EV driving, the possibility of the main battery 10 being insufficiently cooled is low. In addition, as the battery temperature satisfies T0≤TB<T1 which is the condition for proceeding step S106, it is confirmed that the main battery 20 is not in a high temperature state.

Specifically, if the process proceeds to step S106, it can be assumed that the main battery 10 is not in a high temperature state and that there is no possibility of sudden increase in the battery temperature. It can therefore be understood that even execution of the constant duty control with lower cooling capability compared to the variable duty control and the problem detection processing (S107) would not cause an abrupt deterioration (caused by overheating) of the main battery 10.

Once the problem detection processing is executed, the control section 70 continues to drive the cooling fan 40 under the variable duty control based on the duty map shown in FIG. 4 until Ready-OFF (until the control section 70 is shut down) (S108).

If No is determined, that is T1≤TB in step S104, and if Yes is determined, that is if the driving state of the vehicle is EV driving in S105, the process proceeds to step S109.

Step S109 is provided to allow a so-called exception (the second constant control) with respect to the condition that execution of the constant duty control (the first constant control) is prohibited. As described above, the constant duty control may provide a poorer cooling capability than the variable duty control. However, modification of the control condition for the constant duty control would allow sufficient cooling capability. Specifically, the command duty of the constant duty control may be set to a high output duty (second command value) such as the maximum duty.

However, while the modification of the command duty of the constant duty control toward the high output can ensure the cooling capability, such a modification may cause overcooling of the main battery 10 or generate an increased noise of the cooling fan 40 in association with the higher output, leading to a possibility of making passengers feel uncomfortable.

Concerning the former problem (overcooling), the battery temperature TB is equal to or higher than the second temperature T1 or the vehicle is in the state of EV driving with a large burden on the battery if the process proceeds to step S109, it can be considered that there is substantially no possibility of overcooling.

Therefore, in step S109, determination is made as to the latter problem (noise). In step S109, as a condition in which the cooling fan 40 can be driven under the constant duty control at a high output duty, whether or not the noise level within the vehicle interior is a predetermined value Lo or greater is determined.

Specifically, the control section 70 compares the noise level [dB] of the vehicle interior obtained from the sound collecting microphone 116 with the predetermined value Lo, and if the noise level of the vehicle interior is equal to or greater than the predetermined value Lo, executes constant duty control of the cooling fan 40 with a high output duty (S110). At this time, the command duty is set to the maximum duty D3 as show in FIG. 4, for example.

The process further proceeds to step S107 where, during the constant control of the cooling fan 40 with the high output duty being set, the problem determination and detection processing is executed. The control section 70 compares a fixed command rotation rate (ideal rotation rate) based on the command duty D3 with the actual rotation rate. If the difference Δω or the absolute value of the Δω is equal to or greater than a predetermined threshold value, the control section 70, determining that the cooling fan 40 is having a problem, outputs a fan problem signal to a failure diagnosis function unit of the control section 70, for example, which then stores the fan problem signal (diagnosis output).

If the difference in the rotation rates Δω or the absolute value of the difference Δω is less than the predetermined value, on the other hand, the control section 70, determining that the cooling fan 40 is having no problem, outputs a fan normal signal, for example, to the failure diagnosis function unit. The predetermined period which the constant duty control is executed as used herein refers to a time period in which determination of the difference between the actual rotation rate of the cooling fan 40 and the target rotation rate based on the command duty can be made, and may be about several tens of seconds to several minutes, for example.

After determining the presence or absence of a problem, the control section 70 drives the cooling fan 40 under the variable duty control based on the duty map in FIG. 4 until Ready-OFF (S108).

If the noise level within the vehicle interior is less than the predetermined value Lo in step S109, the control section 70 controls the cooling fan 40 under the variable duty control. At this time, as shown in step S111, the control section 70 changes the duty map that is referenced for determining the command duty D in accordance with the battery temperature TB.

Specifically, in step S111, whether or not the battery temperature TB is below a third temperature T2 which is higher than the second temperature T1 and is about 45° C., for example, is determined. If Yes is determined, that is T1≤TB<T2, in step S111, the process proceeds to step S112, and the control section 70 executes the variable duty control based on the low duty map defined by solid line s1 and dashed lines s2 and s3 in FIG. 4.

If No is determined, that is, T2≤TB in step S111, the control section 70 proceeds to step S113, and the control section 70 executes the variable duty control based on the high duty map defined by solid line u1 and dashed lines u2 and u3 in FIG. 4.

After the variable duty control is executed for the predetermined period in steps S112 and S113, the process returns to step S101, and the battery temperature TB is further confirmed (S101, S103, S104) and the driving state is also further confirmed (S105). Then, until the process finally proceeds to step S107 where the problem detection processing of the cooling fan 40 is performed, the processing in accordance with the battery temperature TB and the driving state (S112, S113) is repeatedly executed.

As described above, in the control flow of the cooling system according to the present embodiment, exceptions are allowed the condition that execution of the constant duty control is temporarily inhibited, so that the constant duty control is executed with a setting which is different from a setting used during inhibition of the control. This structure enables an increase in the execution rate under the constant duty control compared to when no exceptions are allowed, resulting in an increase in the execution ratio of the problem detection processing. The increased execution ratio of the problem detection processing would further enable early detection of a problem with the cooling fan 40.

A time period from the start of a vehicle (Ready-ON) to the stop of driving after predetermined traveling (Ready-OFF) is generally referred to as a "trip". In order to detect a problem with the cooling fan 40 at an early stage, it is desirable that a proportion of a trip during which the problem detection processing has been executed (hereinafter referred to as an "inspected trip") be a predetermined value or higher (60% or higher, for example) and a proportion of a trip in which no problem detection processing has been executed (hereinafter referred to as an "uninspected trip") be less than a predetermined value (less than 40%, for example). According to the present embodiment, an increase in the execution ratio of the problem detection processing would be able to lead to a high ratio of the inspected trip as required.

Constant Duty Control

The constant duty control of the cooling fan 40 in step S106 in FIG. 5 will be described in detail with reference to FIG. 6. The constant duty control of the cooling fan 40 is processing including a step of rotating the cooling fan 40 for a predetermined time period with a constant command duty D (the first constant duty control).

The command duty D for executing the constant duty control is modified in accordance with the battery temperature TB, the input and output powers Wi and Wo, and other parameters. More specifically, as shown in step S201 in FIG. 6, for executing the constant duty control, the control section 70 first determines whether or not the battery temperature TB has risen from a temperature below the first temperature T0 and exceeded the first temperature T0 for the first time.

If the control section 70 determines that the condition in step S201 is satisfied, the process jumps from step S201 to step S207, where the command duty D is maintained at the minimum value D1 in the duty map shown in FIG. 4 for the predetermined period. This setting allows the cooling fan 40 to be controlled to rotate at a predetermined target rotation rate (minimum rotation rate).

The process proceeds to step S107 in FIG. 5, where the control section 70 detects the actual rotation rate of the motor 44, that is, the actual rotation rate of the cooling fan 40, using the rotation rate sensor 64. The control section 70 further compares a predetermined command rotation rate based on the command duty D (ideal rotation rate) with the actual rotation rate. If the difference Δω or the absolute value of the difference Δω is equal to or greater than the predetermined threshold value, the control section 70, determining that the cooling fan 40 is experiencing a problem, outputs a fan problem signal to the failure diagnosis function unit of the control section 70, for example, which stores the fan problem signal (diagnosis output).

If the difference in the rotation rates Δω) or the absolute value of the difference Δω is less than the predetermined value, on the other hand, the control section 70, determining that the cooling fan 40 is not experiencing a problem, outputs a fan normal signal to the failure diagnosis function unit, for example. The predetermined time period which the constant duty control is executed as used herein refers to a time period in which it is possible to determine the actual rotation rate of the cooling fan 40 and the target rotation rate based on the command duty, and is between several tens of seconds and several minutes, for example.

If No is determined in step S201, the process proceeds to step S202, and the control section 70 determines whether or not the following condition is satisfied. More specifically, the control section 70, based on the voltage of the main battery 10 detected by the voltage sensor 62 shown in FIG. 1 and the current of the main battery 10 detected by the current sensor 63, calculates an input power Wi to the main battery 10.

If the input power Wi (charging power) to the main battery 10 is smaller than the predetermined threshold value $Wi_{13}$ Lo, the control section 70 determines YES in step S202 in FIG. 6 and the process proceeds to step S203 in FIG. 6.

If YES is determined in step S202, the process proceeds to step S203, and the control section 70 determines whether or not the output power Wo is less than the predetermined threshold value Wo_Lo. Specifically, the control unit 70, based on the voltage of the main battery 10 detected by the voltage sensor 62 and the current of the main battery 10 detected by the current sensor 63, calculates an output power Wo output from the main battery 10, and compares the output power Wo with the predetermined threshold value Wo_Lo.

If the output power Wo from the main battery 10 is smaller than the predetermined threshold value Wo_Lo, the process proceeds to step S207. More specifically, as, in this case, both the input power Wi and the output power Wo are small and the temperature rise in the main battery 10 is also small, the control section 70, determining that a small airflow rate of the cooling fan 40 suffices, advances the process to step S207, and sets the command duty D to the minimum value D1. The process further proceeds to step S107 in FIG. 5, where the control section 70 detects the presence or absence of a problem with the cooling fan 40.

If the input power Wi to the main battery 10 is equal to or greater than the predetermined threshold value Wi_Lo, or if the output power Wo is equal to or greater than the predetermined threshold value Wo_Lo, the process proceeds to step S204 where the control section 70 determines whether or not the following condition can be satisfied.

As described above, the control section 70 determines, in step S201 to step S203 in FIG. 6, whether or not the specific conditions, which are (1) the battery temperature TB has risen from a temperature below the first temperature T0 and exceeded T0 for the first time, and (2) the input and output powers of the main battery 10 are small, can be satisfied, and if any one of these specific conditions is satisfied, the process jumps to step S207 where the control section 70 maintains the command duty D at the minimum value D1 for the predetermined period. This control prevents the main battery 10 from being overcooled and also enables suppression of power consumption caused by driving the cooling fan 40.

If the control section 70 determines that neither of the specific conditions is satisfied, the control section 70 further determines whether or not the battery temperature TB is higher than a reference temperature T3 in step S204. The reference temperature T3 is equal to or higher than the first temperature T0 and is lower than the second temperature T1 at which the constant duty control of the cooling fan 40 is prohibited. As described above, the second temperature T1 is variable depending on the frequency of the problem detection processing of the cooling fan 40 and other conditions, and may be 40° C., for example. As in the example described above, if T0 is 36° C., the reference temperature T3 is 36° C. or higher and lower than 40° C., and may be 38° C., for example.

If the battery temperature TB exceeds time reference temperature T3, such as if the battery temperature TB is 39° C. which is equal to or higher than the first temperature T0 (36° C.) and lower than the second temperature T1 (40° C.)

and also exceeds the reference temperature T3 (38° C.), the process proceeds to step S205.

In step S205, the control section 70 maintains the command duty D at the maximum value D3 shown in the duty map in FIG. 4, to control the cooling fan 40 to rotate at a fixed target rotation rate (maximum rotation rate).

Then, as described above, the process proceeds to step S107 in FIG. 5. More specifically, the control section 70 detects the actual rotation rate of the motor 44 using the rotation rate sensor 64 shown in FIG. 1, compares the fixed target rotation rate (the command rotation rate, the ideal rotation rate) based on the command duty D with the actual rotation rate, and, based on the difference Δω or the absolute value of the difference Δω, determines the presence or absence of a problem.

As described above, if the battery temperature TB is comparatively high, there is no possibility that driving of the cooling fan 40 at the maximum rotation rate to cool the main battery 10 would cause overcooling of the main battery 10, and cooling of the main battery 10 is required. Accordingly, if the battery temperature TB is comparatively high, the control section 70 fixes the command duty D to the maximum value D3.

If the battery temperature TB is equal to or lower than the reference temperature T3, such as if the battery temperature TB is 37° C. which is equal to or higher than the first temperature T0 (36° C.) and is lower than the second temperature T1 (40° C.), and is equal to or lower than the reference temperature T3 (38° C.), for example, the process proceeds to step 206. In step S206, the control section 70 fixes the command duty D at the intermediate value DM between the maximum value D3 and the minimum value D1 shown in the duty map in FIG. 4.

With the above control, the cooling fan 40 is controlled to rotate at a fixed target rotation rate (intermediate rotation rate). Similar to the above-described example, the process then proceeds to step S107 in FIG. 5, where the control section 70 detects the actual rotation rate of the motor 44 using the rotation rate sensor 64 shown in FIG. 1, and in accordance with the difference Δω between the fixed target rotation rate based on the command duty D and the actual rotation rate, determines the presence or absence of a problem, and outputs a signal indicating the result to the failure diagnosis function unit.

Example operations of the cooling system for the on-vehicle secondary battery along the above-described control flow will be described with reference to FIGS. 7A-7C and 8A-8D. These drawings illustrate operation examples of the cooling system, particularly examples in which constant duty control (second constant control) with modified setting as an exception under the condition that the constant duty control (first constant control) is temporally inhibited and the problem detection processing are executed.

Figure 7A:
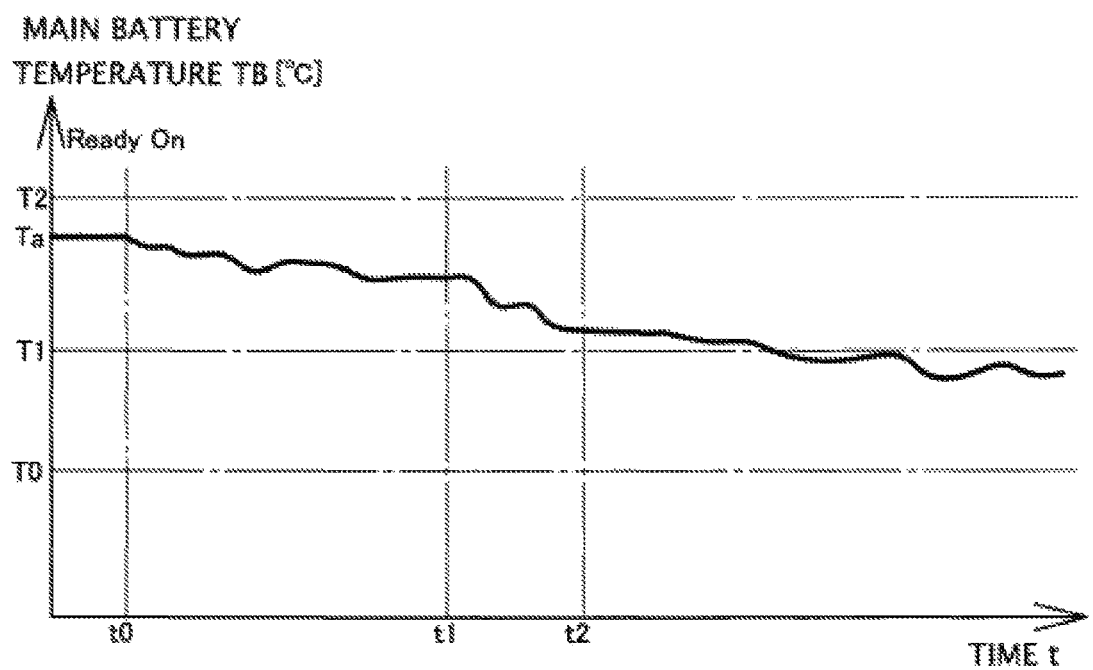
FIGS. 7A-7C are time charts for explaining problem detection processing flow in a case where the battery temperature at the start of the problem detection processing flow is a second temperature T1 or higher.
Figure 7B:
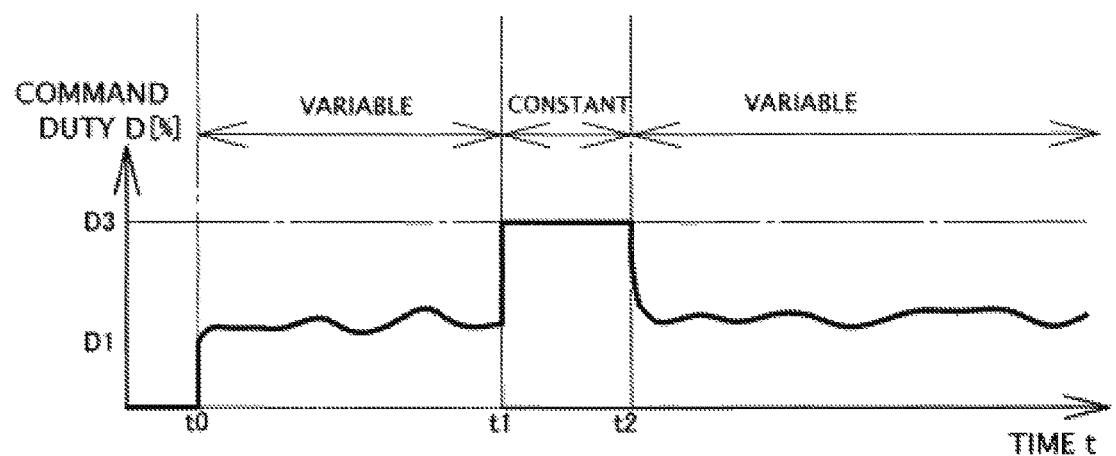
Figure 7C:
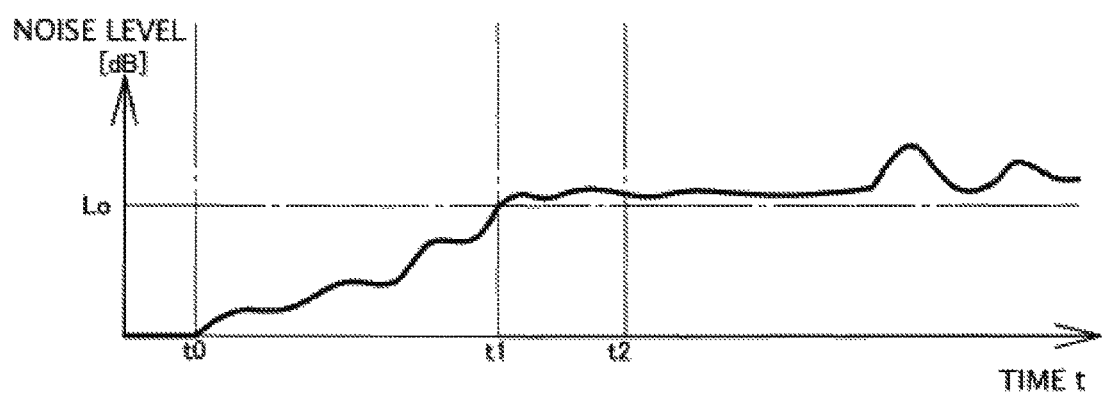
Figure 8A:
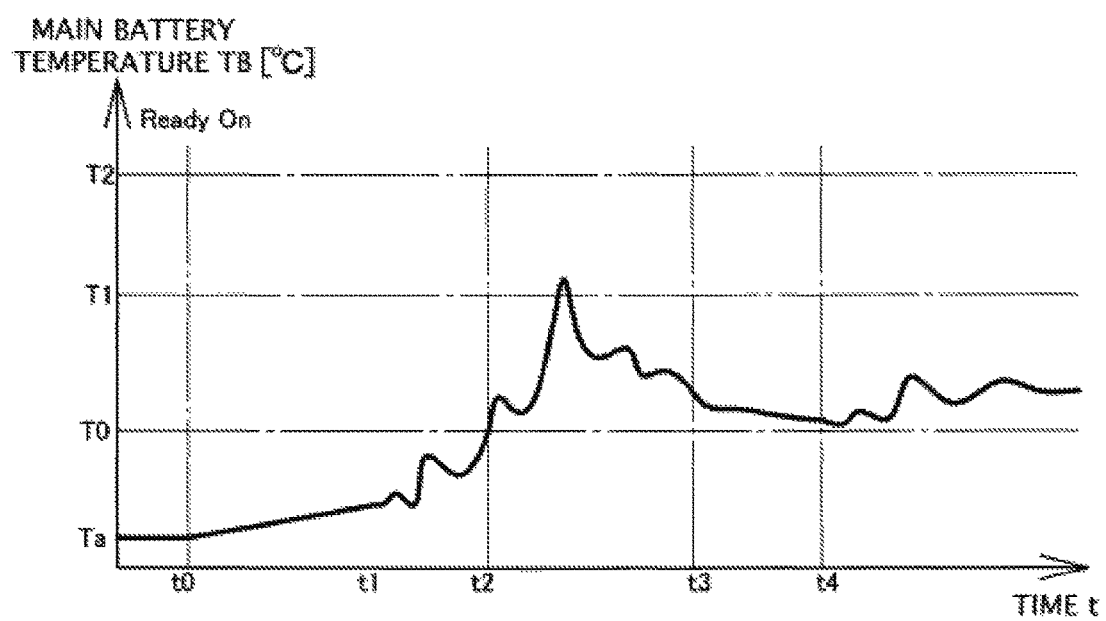
FIGS. 8A-8D are time charts for explaining the problem detection processing flow while driving in EV mode.
Figure 8B:
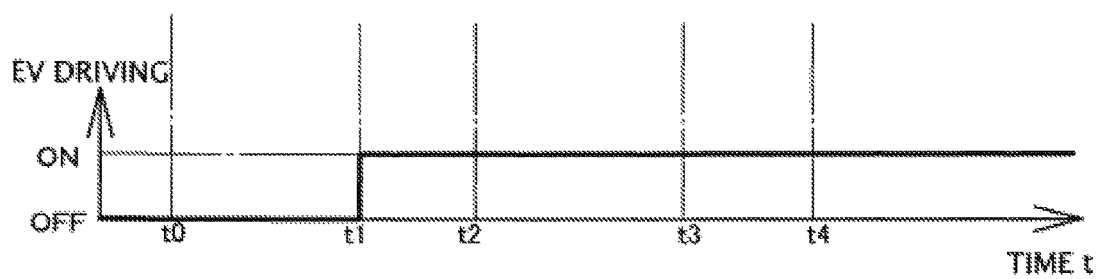
Figure 8C:
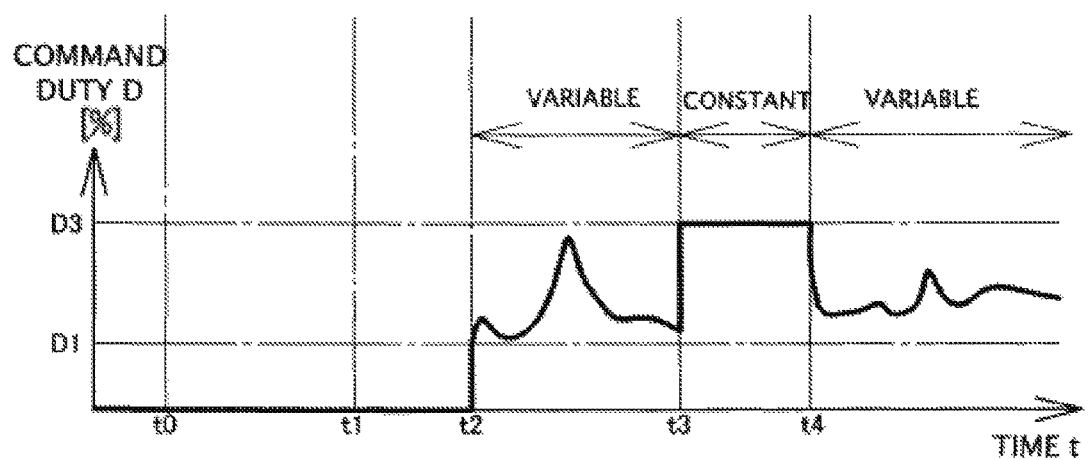
Figure 8D:
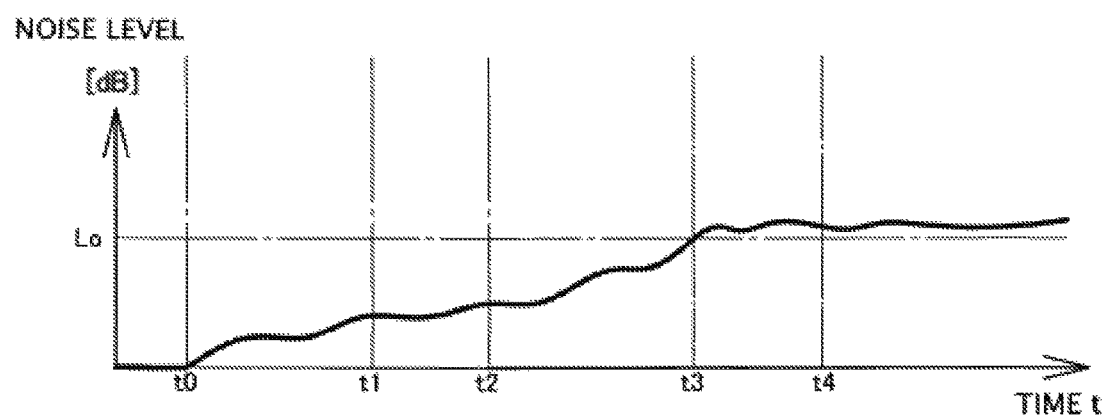

FIGS. 7A-7C illustrate the battery temperature TB in the chart in the upper portion, illustrates the command duty D in the chart in the middle portion, and illustrates the noise level in the chart in the lower portion. FIGS. 8A-8D illustrate the battery temperature TB, the ON-OFF state of EV driving, the command duty D, and the noise level. In all of these charts, the horizontal axis indicates time.

Constant Duty Control Performed when Battery Temperature TB at Start is Second Temperature or Higher In the operation example shown in FIGS. 7A-7C, the process proceeds sequentially, with reference to the flow-chart in FIG. 5, as follows:

S101→S104→S109→S111→S112→S101→S104→S109→S110→S107→S108

First, at time t0 in FIGS. 7A-7C, a Ready-ON signal is input to the control section 70. At a time immediately before time t0, in a Ready-OFF state, the hybrid vehicle 90 and the cooling fan 40 are stopped, and the command duty D of the cooling fan 40 is zero. Further, at the time immediately before time to, the battery temperature TB is temperature Ta which is higher than the second temperature T1.

When the vehicle is placed into the Ready-ON state at time 10, the control section 70 first compares the battery temperature TB with the first temperature T0 (step S101 in FIG. 5). In the example illustrated in FIGS. 7A-7C, at time t0, the battery temperature TB (Ta) is equal to or higher than the first temperature T0.

In response to this determination, the control section 70 further compares the battery temperature TB with the second temperature T1 (step S104 in FIG. 5). In the example illustrated in FIGS. 7A-7C, at time t0, the battery temperature TB (Ta) is equal to or higher the second temperature T1.

The control section 70 further determines whether or not the noise level is equal to or greater than the predetermined value Lo (S109 in FIG. 5). In the example illustrated in FIGS. 7A-7C, at time t0, the noise level is less than the predetermined value Lo.

In response to this determination, the control section 70 compares the battery temperature TB with the third temperature T2 (step S111 in FIG. 5). In the example illustrated in FIGS. 7A-7C, at time t0, the battery temperature TB (Ta) is lower than the third temperature T2. At this time, the control section 70 executes variable duty control with respect to the cooling fan 40, based on the low duty map illustrated in FIG. 4 (step S112 in FIG. 5).

Hereinafter, comparisons between the battery temperature TB and various set temperatures (steps S101, S104, and S111 in FIG. 5) and comparison of the noise level (step S109 in FIG. 5) are repeated, no that the variable duty control with respect to the cooling fan 40 is maintained until time t1.

As illustrated in FIGS. 7A-7C, by driving the cooling fan 40 from time t0, the battery temperature TB is gradually lowered. Further, the noise level increases by driving the cooling fan 40 and other vehicle accessories.

If the noise level is equal to or greater than the predetermined value Lo at time t1, the control section 70 sets the command duty to the maximum value D3 and executes the constant duty control with respect to the cooling fan 40 (S110 in FIG. 5). At this time, the control section 70 further executes problem detection processing for determining the presence or absence of a problem with the cooling fan 40 (S107 in FIG. 5).

After the elapse of a predetermined period since the start of driving the cooling fan. 40 under the constant duty control, the control section 70 terminates the constant duty control of the cooling fan 40, and shifts to the variable duty control at time t2. More specifically, the control section 70, based on the duty map illustrated in FIG. 4, determines the command duty D which varies in accordance with battery temperature TB and other parameters and drives the cooling fan 40 with the variable command duty D.

Constant Duty Control Performed During EV Driving of Vehicle

In the operation example shown in FIGS. 8A-8D, the process proceeds sequentially, with reference to the flow-chart in FIG. 5, as follows:

S101→S102→S103→S105→S109→S110→S107→S108

First, at time t0 in FIGS. 8A-8D, a Ready-ON signal is input to the control section 70. At a time immediately before time t0, in a Ready-OFF state, the hybrid vehicle 90 and the cooling fan 40 are stopped, and the command duty D of the cooling fan 40 is zero. Further, at the time immediately before time t0, the battery temperature TB is temperature Ta which is lower than the first temperature T0.

When the vehicle is placed into the Ready-ON state at time t0, the control section 70 first compares the battery temperature TB with the first temperature T0 (step S101 in FIG. 5). In the example illustrated in FIGS. 8A-8D, at time t0, the battery temperature TB (Ta) is lower than the first temperature T0.

At this time, the control section 70 does not drive the cooling fan 40 and puts the cooling fan 40 on standby until the battery temperature TB reaches the first temperature T0 (steps S102 and S103 in FIG. 5).

After start-up of the vehicle, at time t1, the vehicle starts driving in EV mode (EV driving). In the example illustrated in FIGS. 8A-8D, the vehicle continues to drive in EV mode thereafter. The battery temperature TB gradually rises and reaches the first temperature T0 at time t2. At this time, the control section 70 confirms whether or not the vehicle is driving in EV mode (step S105 in FIG. 5).

At time t2, as the vehicle is driving in EV mode, the process proceeds to the noise level comparison step (S109 in FIG. 5). As the noise level is lower than the predetermined value Lo at time t2 in the example illustrated in FIGS. 8A-8D, the control section 70 executes the variable duty control with respect to the cooling fan 40.

More specifically, the control section 70 compares the battery temperature TB with the third temperature T2 (step S111 in FIG. 5). In the example illustrated in FIGS. 8A-8D, at time t2, the battery temperature TB (Ta) is below the third temperature T2. The control section 70 then executes the variable duty control with respect to the cooling fan 40 based on the low duty map illustrated in FIG. 4 (step S112 in FIG. 5).

Thereafter, the comparison between the battery temperature TB and various set temperatures (steps S101, S104, and S111 in FIG. 5), the determination as to whether or not the vehicle is driving in EV mode (step S105 in FIG. 5), and the comparison of the noise level (step S109 in FIG. 5) are repeated, to execute the various duty control with respect to the cooling fan 40 until time t3.

As illustrated in FIGS. 8A-8D, if the noise level reaches or exceeds the predetermined value Lo at time t3, the control section 70 sets the command duty to the maximum value D3 and executes the constant duty control with respect to the cooling fan 40 (step S110 in FIG. 5). The control section 70 further executes problem detection processing for determining the presence or absence of a problem with the cooling fan 40 (step S107 in FIG. 5).

After elapse of the predetermined period since the start of driving the cooling fan 40 under the constant duty control, the control section 70 terminates the constant duty control of the cooling fan 40, and shifts the control to the various duty control at time t4. More specifically, the control section 70 determines the command duty D which varies in accordance with the battery temperature TB and other parameters based on the duty map in FIG. 4, and drives the cooling fan 40 with the variable command duty D.

Other Embodiments Concerning Noise Level Determination Criteria

While in the embodiment described above the vehicle interior sound obtained through the sound collecting microphone 116 is used for determining the noise level, the present invention is not limited to this example, and the noise level may be determined indirectly based on the driving status of the various devices serving as sound sources.

The first examples of the source of vehicle interior sound may include sound from audio systems, sound of the air conditioner, and other sound sources. Therefore, when the control section 70 detects actuation (ON-state) of the on-vehicle audio system with reference to the ON/OFF state of the audio switch 110, the control section 70 may determine that the noise level is equal to or greater than the predetermined level Lo.

Alternatively, when it is determined that the air conditioning blower within the vehicle interior is actuated (ON state), with reference to the ON/OFF state of the air conditioner switch 112, the control section 70 may determine that the noise level is equal; to or greater than the predetermined level Lo.

Further, when the window of the vehicle is open, as the sound outside the vehicle comes into the vehicle interior, it can be determined that the noise level is equal to or greater than the predetermined level Lo. The control section 70 may therefore obtain information concerning the degree of opening of the vehicle interior window from the power window switch 114 and determine that the noise level is equal to or greater than the predetermined level Lo when the vehicle interior window is open.

The noise level may also be determined indirectly in consideration of so-called engine noise or load noise as another source of the sound outside the vehicle. When the engine is being driven, for example, the control section 70 may determine that the noise level is equal to or greater than the predetermined level Lo.

Here, the process proceeds to the determination step of the noise level S109 when the condition that the battery temperature TB is equal to or greater than the second temperature T1 or the condition that the vehicle is driving in EV mode is satisfied. As there is no possibility, in accordance with the definition of the EV driving, that the engine is being driven under the latter condition (EV driving), the control section 70 may perform determination concerning the engine driving only under the former condition.

With regard to the load noise, when it is determined, during driving of the vehicle, with reference to the vehicle speed measured by the vehicle speed sensor 65, or the vehicle speed calculated with reference to the accelerator position Ace, that the vehicle speed is equal to or greater than a predetermined value, the control section 70 may determine that the noise level is equal to or greater than the predetermined value Lo. As the load noise is generated while the vehicle is moving both forward and backward, the predetermined value of the vehicle speed is set to anon-zero value. Alternatively, in consideration of only the load noise that is generated while the vehicle is moving forward, the predetermined value of the vehicle speed may be set to a positive value. In addition, the control section 70 may determine that the noise level is equal to or greater than the predetermined value Lo when it is determined, based on information from the navigation system 30, that the hybrid vehicle 90 is driving on an expressway.

Other Embodiments

Figure 9:
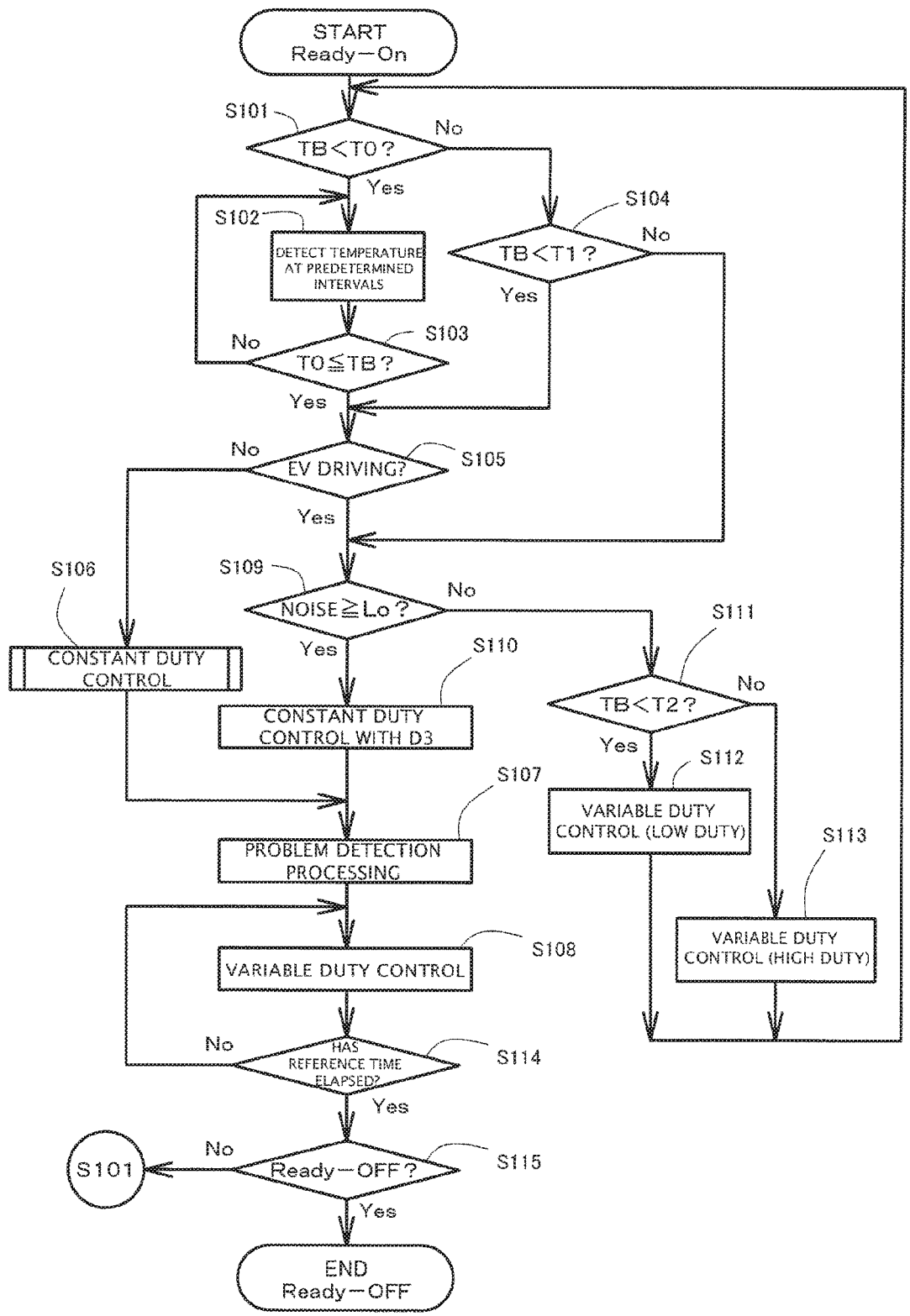
FIG. 9 is a flowchart showing a cooling system for an on-vehicle secondary battery according to another embodiment of the present invention.

While in the embodiment described above the problem detection processing of the cooling fan 40 is performed only once during one trip, the problem detection processing of the cooling fan 40 may be performed a plurality of times during a single trip. As shown in step S114 in FIG. 9, for example, the system may be configured such that whether or not the time which has elapsed since the execution of the problem detection processing is equal to or longer than a reference time is periodically confirmed and, if the elapsed time is the reference time or longer and the vehicle is not in the Ready-Off state, the process returns to step S101 (step S115). In this case, the number of times that the problem detection processing is performed during one trip is counted in step S107.

In this case, the control section 70 further monitors whether or not the execution condition for the constant duty control is satisfied, and if the condition is satisfied, executes the constant duty control and the problem detection processing once again. This periodical execution of the problem detection processing enables detection of a problem with the cooling fan 40 at an earlier stage.

While in the embodiment described above the control section 70 calculates and outputs the command duty D, the control unit 45 of the cooling fan 40 may calculate the command duty D and control the motor 44.

Specifically, the control unit 45 may calculate the duty for driving the cooling fan 40 based on necessary information for the driving control of the cooling fan 40 such as battery temperature TB and other information input to the control unit 45 by the control section 70.

Further, while in the embodiment described above a direct current motor is employed as the motor 44 for driving the cooling fan 40, an alternating current motor may be employed. In this case, the control unit 45 may generate an alternating current waveform in accordance with the duty and control the rotation rate of the alternating current motor.

In addition, while in the embodiment described above, the cooling fan 40 is provided on the suction duct 46 side and is configured as a so-called suction type cooling fan, the cooling fan is not limited to this type. For example, the cooling fan 40 may be configured as a so-called suction type cooling fan which is provided on the exhaust duct 49 side and causes a negative pressure within the connection duct 47 and the casing 48 to thereby supply cooled air to the main battery 10.

Also, while in the embodiment described above, the period from Ready-ON to Ready-OFF is defined as "a trip", only a specific period in such a period which satisfies a specific condition may be counted as "a trip". For example, in the period from Ready-ON to Ready-OFF, only a period which satisfies at least one of predetermined conditions including a condition that the period is 10 minutes or longer, a condition that continuous idling is performed for 30 seconds or more during the period, a condition that the vehicle travels at 40 km per hour for a certain time during the period, and other conditions, may be counted as "a trip".

Further, while in the embodiment described above, the cooling fan 40 is controlled based on the assumption that there is a passenger in the vehicle, the constant duty control and the problem detection processing of the cooling fan 40 may be performed when no passengers are in the hybrid vehicle 90 after Ready-On. More specifically, the constant duty control and the problem detection processing of the cooling fan 40 may be performed when the vehicle is started by an external charging operation.

In addition, while in the embodiment described above driving of the cooling fan 40 is inhibited if the battery temperature TB is below the first temperature T0 so as to avoid overcooling of the main battery 10, this condition may also have exceptions. Specifically, even if the battery temperature TB is b-low the first temperature T0, the battery temperature TB of the main battery 10 would rise quickly when the hybrid vehicle 90 is driving in EV mode. The system may be therefore configured to perform constant control of the cooling fan 40 with the duty D3 and also perform the problem detection processing if the condition that the noise level of the vehicle interior is equal to or greater than the predetermined value Lo is satisfied.

While the preferred embodiments of the present invention have been described using specific terms, such description is for illustrative purposes only, and it is to be understood that changes and variations may be made without departing from the spirit or scope of the appended claims.

The invention claimed is:

1. A cooling system for cooling a secondary battery mounted on a hybrid vehicle for driving the vehicle, the cooling system comprising:
   a cooling fan configured to blow cooled air to the secondary battery; and
   a temperature sensor configured to detect a battery temperature, the battery temperature being a temperature of the secondary battery, wherein
   if the battery temperature is equal to or higher than a first temperature after start-up of the hybrid vehicle, the cooling system, for a predetermined time period, performs first constant control for driving the cooling fan with a first command value and also performs problem detection processing for detecting presence or absence of a problem with the cooling fan based on an actual rotation rate of the cooling fan during the constant control, and
   if the battery temperature is equal to or higher than the first temperature and, during inhibition of the first constant control under a predetermined condition, a noise level within a vehicle interior is equal to or higher than a predetermined value the cooling system performs second constant control for driving the cooling fan with a second command value, which is a command value for a higher output than the first command value, and also performs the problem detection processing based on an actual rotation rate of the cooling fan during the second constant control.

2. The cooling system for a secondary battery mounted on a vehicle according to claim 1, wherein
   when at least one of a condition that an on-vehicle audio system is placed in an ON state, a condition that an air conditioning blower within the vehicle interior is placed in an ON state, a condition that a vehicle interior window is open, and a condition that an engine is being driven is established, it is determined that the noise level within the vehicle interior is equal to or higher than the predetermined value.

3. The cooling system for a secondary battery mounted on a vehicle according to claim 1, wherein
   the cooling system performs the problem detection processing by determining a deviation from the actual rotation rate of the cooling fan from a command rotation rate of the cooling fan.

4. The cooling system for a secondary battery mounted on a vehicle according to claim 1, further comprising:
   a rotation rate sensor configured to detect the actual rotation rate of the cooling fan during the first or second constant control,
   wherein the cooling system performs the problem detection processing based on the actual rotation rate detected by the rotation rate during the first constant control sensor.

5. The cooling system for a secondary battery mounted on a vehicle according to claim 1, wherein
   the condition under which the first constant control is inhibited includes at least one of a condition that the battery temperature at the start-up of the vehicle is equal to or higher than a second temperature, and a condition that the battery temperature is equal to or higher than the first temperature and the hybrid vehicle is driving in an EV mode in which the vehicle is driven solely by a rotary electric machine.

6. The cooling system for a secondary battery mounted on a vehicle according to claim 5, wherein when at least one of a condition that an on-vehicle audio system is placed in an ON state, a condition that an air conditioning blower within the vehicle interior is placed in an ON state, a condition that a vehicle interior window is open, and a condition that an engine is being driven is established, it is determined that the noise level within the vehicle interior is equal to or higher than the predetermined value.

* * * * *

UNITED STATES PATENT AND TRADEMARK OFFICE
CERTIFICATE OF CORRECTION

| | |
|---|---|
| PATENT NO. | : 10,297,883 B2 |
| APPLICATION NO. | : 15/094216 |
| DATED | : May 21, 2019 |
| INVENTOR(S) | : Junta Izumi et al. |

Page 1 of 1

It is certified that error appears in the above-identified patent and that said Letters Patent is hereby corrected as shown below:

On the Title Page

Item [30], Insert:
--Apr. 10, 2015 (JP) ....................2015-080686--

Signed and Sealed this
Twenty-eighth Day of April, 2020

Andrei Iancu
*Director of the United States Patent and Trademark Office*